(12) United States Patent
Yamada et al.

(10) Patent No.: US 7,014,774 B2
(45) Date of Patent: Mar. 21, 2006

(54) METHOD OF TREATING OIL-CONTAINING WASTE WATER

(75) Inventors: Hiroshi Yamada, Chita-Gun (JP); Daizo Hibino, Nagoya (JP)

(73) Assignee: Shin-Nippon Wex Co., Ltd., Nagoya (JP)

( * ) Notice: Subject to any disclaimer, the term of this patent is extended or adjusted under 35 U.S.C. 154(b) by 89 days.

(21) Appl. No.: 10/734,914

(22) Filed: Dec. 12, 2003

(65) Prior Publication Data
US 2004/0149662 A1    Aug. 5, 2004

(30) Foreign Application Priority Data
Jan. 30, 2003    (JP)    .............................. 2003-021495

(51) Int. Cl.
*C02F 1/56*    (2006.01)
(52) U.S. Cl. ...................... 210/708; 210/709; 210/725; 210/727; 210/734; 210/737; 516/169; 516/172
(58) Field of Classification Search ................ 210/705, 210/708, 709, 725, 727, 728, 734, 737; 516/154, 516/155, 161, 169, 172
See application file for complete search history.

(56) References Cited
U.S. PATENT DOCUMENTS

| | | | |
|---|---|---|---|
| 4,108,768 A * | 8/1978 | Sebelik et al. ............... | 210/705 |
| 4,179,369 A * | 12/1979 | Bradley et al. ............... | 210/708 |
| 4,238,330 A * | 12/1980 | Fong et al. .................. | 210/708 |
| 4,319,013 A | 3/1982 | Cabestany et al. ........... | 526/287 |
| 5,015,391 A * | 5/1991 | Mohn .......................... | 210/708 |
| 5,374,358 A * | 12/1994 | Kaniecki et al. ............. | 210/704 |
| 5,529,696 A * | 6/1996 | Tibbitts ....................... | 210/705 |
| 5,531,905 A | 7/1996 | Dobrez et al. ............... | 210/709 |
| 5,807,487 A * | 9/1998 | Lahti ........................... | 210/665 |
| 5,853,596 A * | 12/1998 | Gibson ........................ | 210/708 |
| 6,217,778 B1 * | 4/2001 | Shing et al. ................. | 210/708 |
| 6,240,585 B1 * | 6/2001 | Praechter et al. .............. | 8/158 |
| 6,627,086 B1 | 9/2003 | Mahoney et al. ............ | 210/725 |

FOREIGN PATENT DOCUMENTS

JP    05-285305    11/1993

* cited by examiner

*Primary Examiner*—Peter A. Hruskoci
(74) *Attorney, Agent, or Firm*—Burr & Brown

(57) ABSTRACT

A method of treating an oil-containing waste water includes adding, where the waste water has been adjusted to have a pH between eight and twelve and have a temperature not higher than 50° C., a high-cationic flocculant consisting of a high-molecular material selected from among acrylamide-quaternized or salified dimethylaminoethyl acrylate or methacrylate copolymer, and acrylamide-quaternized or salified dimethylaminoethyl acrylate or methacrylate-acrylic acid copolymer, and which constitutes a plurality of polymerized units at least 60 mol % of which have respective cationic functional groups, to the waste water, such that a concentration of the flocculant in the waste water falls between 100 mg/L and 1,000 mg/L, so that at least one fouling component dispersed in the water is flocculated to form a sludge consisting of flocks of the at least one fouling component and thereby separate the at least one fouling component and the water.

5 Claims, 1 Drawing Sheet

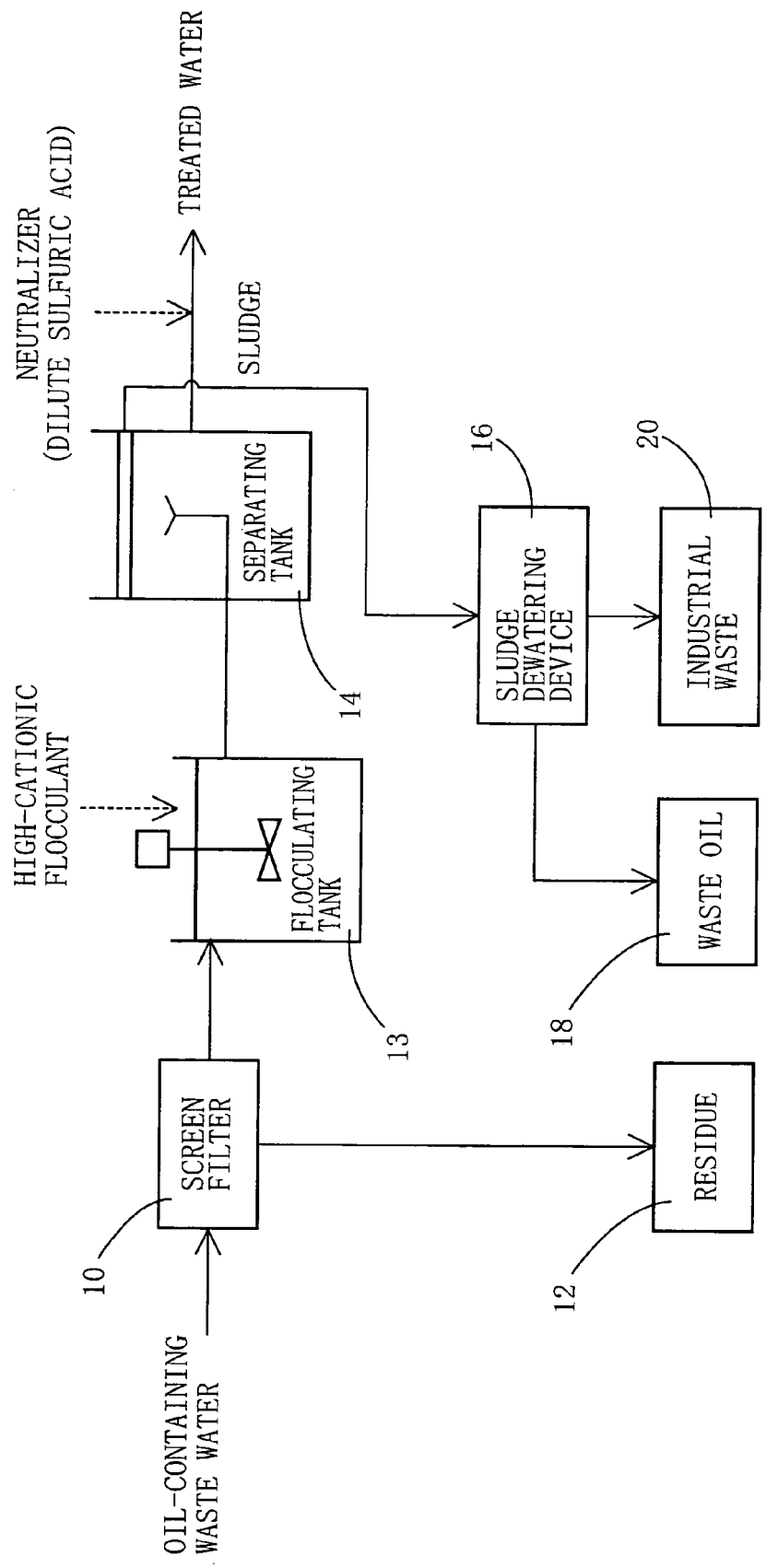

METHOD OF TREATING OIL-CONTAINING WASTE WATER

This application claims the benefit of Japanese Patent Application No. 2003-021495 filed on Jan. 30, 2003, the entirety of which is incorporated hereinto by reference.

BACKGROUND OF THE INVENTION

1. Field of the Invention

The present invention relates to a method of treating an oil-containing waste water, and particularly to such a method of treating an oil-containing waste water in which one or more fouling components including oil are finely dispersed in water by a surfactant, and thereby separating the fouling components and the water from each other.

2. Discussion of Related Art

Generally, in machine factories in which respective sorts of machines are used, or in cleaning shops, articles bearing fouling components including oil are washed or cleaned using water, a surfactant, and an alkaline agent, and a large amount of oil-containing waste water in which the fouling components are dispersed in the water by the surfactant is produced. The oil-containing waste water is subjected to a treatment in which the fouling components including oil and the water are separated from each other. Then, the fouling components are removed from the waste water, and only the water is discharged into the environment.

Since, in the above-indicated oil-containing waste water, the fouling components are dispersed in the form of very fine particles in the water by the surfactant, such a treating method has been conventionally used in which, after a preliminary treatment in which a screen filter or the like is used to remove solid matters suspended in the waste water, three steps are carried out to separate the fouling components and the water from each other.

More specifically explained, after the above-described preliminary treatment, the first step is carried out in which an appropriate amount of dilute sulfuric acid is added to the oil-containing waste water, so that a pH value of the waste water is made not greater than three and a major portion of the oil is separated from the fouling components owing to a decomposing effect of the dilute sulfuric acid. The thus separated major portion of the oil is removed from the waste water. Subsequently, the second step is carried out in which a neutralizer such as sodium hydroxide is added to the waste water from which the major portion of oil has been removed, so as to neutralize the waste water. In addition, aluminum sulphate, PAC, or emulsion breaker is added to the neutralized waste water so as to form fine flocks consisting of the remaining portion of oil dispersed in the waste water and the other fouling components than the oil. Moreover, an appropriate amount of high-molecular flocculant or coagulant is added to the waste water in which the fine flocks have been formed, such that a concentration of the flocculant in the waste water ranges from 10 to 50 mg/L(liter). Thus, the formation of the fine flocks is promoted and the fine flocks are grown into a sludge. The waste water in which the sludge has been formed is subjected to a known floatation separation method in which the sludge is caused to float on the surface of the waste water. This sludge is removed from the waste water. Then, the third step is carried out in which an inorganic adsorbent such as bentonite is added to the waste water and additionally an appropriate amount of high-molecular flocculant is added to the waste water so that a concentration of the flocculant in the waste water is about 20 mg/L(liter). Thus, the remaining portion of oil and the other fouling components dispersed in the waste water are flocculated or coagulated in a state in which the oil and the other fouling components are adsorbed by the inorganic adsorbent, and accordingly an additional amount of sludge is formed. This sludge is removed by the same method as used in the second step. In this way, the oil-containing waste water is completely separated into the fouling components including oil, and the water. This oil-containing waste water treating method is disclosed in, e.g., JP-A-5-285305.

However, in the above-explained, conventional oil-containing waste water treating method, the oil-containing waste water is treated using the respective sorts of agents and/or chemical compounds in the three steps. Thus, the conventional method is not economical, and is complicated as a whole. In addition, since the three steps use respective different treatment equipment, the overall cost needed to prepare such equipment is significantly increased, and the footprint needed to dispose all of them is large-scaled. Moreover, in the conventional method, the respective steps produce the oil or the sludge that contains the treating agent and/or chemical compound added to the waste water. Thus, the total amount of oil and sludge produced by the three steps is inevitably increased, and additional cost and labor are needed to treat the increased amount of oil and sludge.

SUMMARY OF THE INVENTION

It is therefore an object of the present invention to provide an oil-containing waste water treating method which is for treating an oil-containing waste water produced by cleaning an article, and thereby separating the waste water into one or more fouling components including oil, and water, which can be carried out using a small-scale equipment, at a low cost, and in one or more simple steps, and which can advantageously decrease an amount of sludge formed of the fouling components separated from the water and thereby effectively reduce the cost and labor needed to treat the sludge.

The inventors have carried out extensive studies to achieve the above-indicated object, and found that only in the case where a specific sort of high-molecular flocculant or coagulant is added to an oil-containing waste water that has been adjusted to have a pH value in a specific alkaline range and a temperature not higher than a specific value, such that a concentration of the flocculant in the waste water falls in a specific range sufficiently higher than the range of concentration of the conventionally used flocculant, substantially all amounts of fouling components including oil that are finely dispersed in the waste water can be flocculated or coagulated at once by the high-molecular flocculant.

The present invention has been developed based on the above-indicated finding, and is characterized in that pH value and temperature of an oil-containing waste water and sort and concentration of a high-molecular flocculant or coagulant are combined with each other in a specific manner that has not been known in the art. Thus, the present invention consists in a method of treating an oil-containing waste water which is produced by washing, with a surfactant, an article bearing at least one fouling component including an oil, and in which the at least one fouling component is finely dispersed in the water by the surfactant, the method comprising the step of adding, under a condition that the oil-containing waste water has been adjusted to have a pH value greater than eight and smaller than twelve and have a temperature not higher than 50° C., a high-cationic flocculant consisting of a high-molecular material which is selected from the group consisting of acrylamide-quaternized or salified dimethylaminoethyl acrylate or methacrylate copolymer, and acrylamide-quaternized or salified dimethylaminoethyl acrylate or methacrylate-acrylic acid copolymer, and which is constituted by a plurality of polymerized units not less than 60 mol % of which have respective cationic functional groups, to the oil-containing waste water, such that a concentration of the high-cationic flocculant in the oil-containing waste water falls in a range of from 100 mg/L to 1,000 mg/L, so that the at least one fouling component dispersed in the water is flocculated to form a sludge consisting of flocks of the at least one fouling component and thereby separate the at least one fouling component and the water from each other.

In the oil-containing waste water treating method according to the present invention, the above-indicated specific high-cationic flocculant is employed, and is added to the oil-containing waste water whose pH value and temperature have been adjusted to fall in the respective specific ranges, such that the concentration of the specific flocculant in the waste water falls in the specific range sufficiently higher than the range of concentration of the conventional high-molecular flocculant used to just flocculate fine flocks consisting of fouling components including oil or just flocculate fouling components adsorbed by a certain adsorbent. Therefore, substantially all amounts of fouling components including oil that are finely dispersed in the waste water can be flocculated at once by the specific high-cationic flocculant, as described above.

In the present method, the specific high-cationic flocculant is just added, in just one step, under the above-indicated condition, to the oil-containing waste water, and consequently substantially all amounts of fouling components including oil are flocculated to form a sludge consisting of flocks of the fouling components. Thus, the oil-containing waste water is completely separated into the fouling components and the water. That is, the present method differs from the conventional method in which respective sorts of agents andior chemical compounds are sequentially added to an oil-containing waste water so as to stepwise separate the waste water into fouling components including oil, and water. The present method can be carried out using a single treatment equipment to add the specific flocculant to the waste water, and does not need any other equipment. Moreover, since only the single sort of chemical agent is needed to separate the oil-containing waste water into the fouling components and the water, the total amount of sludge consisting of the fouling components separated from the water can be effectively reduced.

Therefore, the present oil-containing waste water treating method can be carried out using equipment which is as small as possible, at a low cost, and in one or more simple steps, and can advantageously decrease the amount of sludge formed of the fouling components separated from the water and thereby effectively reduce the cost and labor needed to treat the sludge. Thus, the present method can more advantageously reduce the economical and operation-related loads about the treatment of oil-containing waste water, than the conventional method.

According to a preferred feature of the present invention, the oil-containing waste water treating method further comprises a step of introducing the waste water in which the sludge has been formed, into a separating tank, so that the sludge floats on a surface of the waste water. The sludge has a smaller specific gravity than that of the water, because the sludge contains the oil. Therefore, when the waste water is introduced into the separating tank, the sludge naturally floats on the surface of the waste water. Thus, the sludge can be easily collected and efficiently removed using, e.g., a scraper. In addition, the discharging of the waste water from which the sludge has been removed can be easily carried out.

According to another feature of the present invention, the oil-containing waste water treating method further comprises a step of adding, after the sludge is removed from the waste water in which the sludge has been formed and accordingly the at least one fouling component and the water have been separated from each other, a neutralizer to the waste water to neutralize the waste water. Thus, the waste water from which the sludge has been removed can be advantageously subjected to, e.g., a biochemical treatment, and the waste water discharged into the environment can be more effectively prevented from polluting the environment.

BRIEF DESCRIPTION OF THE DRAWING

The above and other objects, features, advantages and technical and industrial significance of the present invention will be better understood by reading the following detailed description of preferred embodiments of the invention, when considered in connection with the accompanying drawing, in which:

the single FIGURE is a diagrammatic view for explaining an oil-containing waste water treating method according to the present invention.

DETAILED DESCRIPTION OF PREFERRED EMBODIMENTS

An oil-containing waste water to be treated by a method according to the present invention is, for example, one that is discharged from various sorts of machine factories, print factories, food factories, maintenance shops such as automobile maintenance shops, etc., when machines, equipment, etc. that are used there and bear one or more fouling components including mineral oil or vegetable oil, or including not only oil but also dust or mud, are cleaned using water and a surfactant, or one that is discharged from cleaning shops, the above-indicated factories or shops, individual homes, or other sorts of facilities, when laundry that is treated or produced there and bear one or more fouling components including mineral or vegetable oil, or including not only oil but also other fouling components, are cleaned using water and a surfactant.

Thus, the oil-containing waste water is polluted water that is produced when an article bearing one or more fouling components including oil is cleaned using water and a surfactant, and accordingly contains the surfactant and the fouling component or components that is or are finely dispersed in the water by the surfactant. The fouling component may be oil only, and the fouling components may include not only oil but also dust or mud. In the case where articles to be cleaned are clothes or the like, an oil-containing waste water produced by cleaning the articles is polluted water that contains fibers or the like in addition to the above-indicated fouling component or components. The surfactant used to finely disperse the fouling components in the waste water is not limited to any specific sorts. For example, a commonly used anionic surfactant or a non-ionic surfactant may be used.

In a preferred embodiment of the present invention, shown in the drawing, an oil-containing waste water is treated as follows: First, a screen filter 10 is used, as needed, to filter the oil-containing waste water to remove solid matters such as fibers and/or dusts that are suspended in the waste water. This is a preliminary treatment known in the art. Residue 12 obtained in this step is discarded; and the oil-containing waste water thus filtered by the screen filter 10 is introduced into a flocculating tank 13.

In the present method, before or after the preliminary treatment using the screen filter 10, a pH value of the oil-containing waste water is adjusted by adding, as needed, an acid or a base to the waste water, so that the pH value of the waste water is greater than eight and is smaller than twelve. Although a high-cationic flocculant is added, as will be described in detail later, to the oil-containing waste water so as to flocculate fouling components including oil that are finely dispersed in the waste water, the high-cationic flocculant cannot exhibit a good effect of flocculating the fouling components if the pH value of the waste water is not greater than eight or not smaller than twelve. The high-cationic flocculant can exhibit a better effect of flocculating the fouling components if the pH value of the oil-containing waste water falls in the range of from 9 to 11.

As is well known in the art, when a surfactant is used to clean a certain article, an appropriate base is added, together with the surfactant, to a cleaning water for a generally known purpose of increasing a degreasing power of the surfactant. Thus, the original oil-containing waste water is made alkaline. If the pH value of this original oil-containing waste water falls in the above-indicated range because of the addition of the base, then the pH value of the waste water need not be adjusted any more.

In addition, in the present method, either before or after the preliminary treatment using the screen filter 10, a temperature of the oil-containing waste water is adjusted to be not higher than 50° C., while the pH value of the-same is adjusted as described above. If the temperature of the oil-containing waste water is higher than 50° C., then the dispersion of the fouling components caused by the surfactant is very stable and, even if the high-cationic flocculant may be added, the flocculant cannot satisfactorily flocculate the fouling components.

More preferably, the temperature of the oil-containing waste water is adjusted to be not higher than 30° C., for the purpose of improving the fouling-component flocculating effect of the high-cationic flocculant. However, in the case where the temperature of the oil-containing waste water is not higher than 50° C. before the preliminary treatment using the screen filter 10, then the temperature of the waste water need not be adjusted any more.

Thus, under a condition that the solid matters suspended in the oil-containing waste water have been removed, as needed, and the pH value and temperature of the same have been adjusted to fall in the above-indicated respective ranges, the waste water is introduced into the flocculating tank 13 and subsequently the high-cationic flocculant is added to, and is mixed with, the waste water accommodated in the flocculating tank 13.

The above-mentioned high-cationic flocculant is a high-molecular material which is selected from the group consisting of acrylamide-quaternized or salified dimethylaminoethyl acrylate or methacrylate copolymer, and acrylamide-quaternized or salified dimethylaminoethyl acrylate or methacrylate-acrylic acid copolymer.

This high-molecular material is a high-cationic polymer that is formed or constituted by a number of polymerized units not less than 60 mol % of which have respective cationic functional groups. That is, not less than 60 mol % of dimethylaminoethyl-acrylate units or dimethylaminoethyl-methacrylate units as the polymerized units are each quaternized or salified in the known manner. This flocculant is added to the oil-containing waste water.

The monomer used to form or constitute the above-indicated copolymer as the high-cationic flocculant is not limited to any specific sorts. In addition, an upper limit of the degree of cationicity of the polymer is not limited to any specific value, although the lower limit of the degree is limited to not less than 60 mol %.

In the present method, the high-cationic flocculant is added, to the oil-containing waste water, in a sufficiently large amount that has never been conventionally used for the purpose of just flocculating fine flocks consisting of fouling components including oil or for the purpose of just flocculating fouling components adsorbed by a certain adsorbent.

More specifically described, the high-cationic flocculant is added, to the oil-containing waste water, in a very large amount that assures that a concentration of the flocculant in the waste water falls in a range of from 100 mg/L (liter) to 1,000 mg/L. If the flocculant is added to the waste water such that the concentration of the flocculant is lower than 100 mg/L, or higher than 1,000 mgIL, that is, if the amount of flocculant added to the waste water is too small or too large, then the flocculant cannot exhibit its fouling-component flocculating effect to a sufficiently satisfactory degree.

In short, in the present method, a specific high-cationic flocculant is added in a large amount that has never been conventionally expected or thought, to an oil-containing waste water whose pH value and temperature have been adjusted to respective appropriate values, so that the fouling components including oil that are finely dispersed in the waste water are flocculated, at once, and a sludge consisting of flocks of the fouling components is formed. Thus, in the oil-containing waste water, the fouling components and the water are effectively and reliably separated from each other.

When such a large amount of high-cationic flocculant is added to the oil-containing waste water, the flocculant present in a solid state may be added, as it is, to the waste water. However, generally, the flocculant is solved in water and this aqueous solution is added to, and is mixed with, the waste water.

An amount of high-cationic flocculant that is actually added to an oil-containing waste water may be determined, within the above-indicated concentration range, such that the amount of the flocculant is proportional to the amount of the fouling components dispersed in the waste water. However, preferably, the amount of the flocculant to be added is determined according to the following formula (1):

$$P = k \cdot \sqrt{(N)} \tag{1}$$

where P is an amount (mg/L) of the flocculant to be added;
k is a coefficient ranging from 2 to 5; and
N is an amount of substance extracted from the waste water by n-hexane.

Thus, the fouling components including oil that are finely dispersed in the oil-containing waste water are flocculated by the addition of the high-cationic flocculant to the waste water, so that a sludge consisting of flocks of the fouling components is formed. Thus, the oil-containing waste water is separated into the fouling components or the sludge and the water, and this waste water is introduced into a separating tank 14 that is known as a floatation separation equipment in the art, so that the sludge floats on the surface of the waste water.

Then, the sludge floating on the surface of the waste water is collected using, e.g., a scraper, and is removed from the separating tank 14, and a treated water as the water separated from the sludge is discharged from the separating tank 14.

The sludge removed from the separating tank 14 is treated by a sludge dewatering device 16 known in the art, so that the sludge is separated into a waste oil 18 extracted from the sludge and an industrial waste 20 as a remainder of the sludge from which the waste oil 18 has been extracted. The waste oil 18 and the industrial waste 20 are discarded separately from each other.

Meanwhile, an appropriate neutralizer such as dilute sulfuric acid is added to the treated water from which the fouling components have been separated and removed and which has been discharged from the separating tank 14, so as to neutralize the treated water. Then, the neutralized water is subjected, as needed, to a biochemical treatment known in the art. Finally, the neutral water from which the fouling components including the oil have been removed is discharged as a cleaned-up water into the environment.

As is apparent from the foregoing description of the present method, the oil-containing waste water from which the solid matters have been filtered out, as needed, and whose pH value and temperature have been adjusted to the respective appropriate values, is introduced into the separating tank 14 and, in the separating tank 14, the specific high-cationic flocculant is just added in the specific amount, in just one step, to the waste water, so that the fouling components including the oil that are finely dispersed in the waste water are flocculated at once and accordingly the sludge consisting of flocks of the fouling components is formed. Thus, the oil-containing waste water is effectively and efficiently separated into the fouling components and the water.

The present treating method apparently differs from a conventional treating method in which respective sorts of treatment equipment are used to sequentially add respective sorts of chemical agents to an oil-containing waste water so as to stepwise separate the waste water into fouling components including oil, and water. That is, the present method needs only the single sort of treatment equipment and the single sort of chemical agent so as to separate the oil-containing waste water into the fouling components and the water. Thus, the present oil-containing waste water treating method can be advantageously simplified and the cost needed to treat the waste water can be effectively decreased. Moreover, since only the single sort of chemical agent is needed to treat the oil-containing waste water, the amount of the sludge containing the chemical agent can be advantageously reduced.

In the present oil-containing waste water treating method, the treatment equipment needed to treat the oil-containing waste water and thereby separate the waste water into the fouling components including oil, and the water, can be largely reduced in size or scale, and the treatment cost and operation can be advantageously decreased and simplified. Moreover, the cost and labor needed to treat the sludge resulting from the treatment of the oil-containing waste water can also be reduced to an advantage. Thus, the present oil-containing waste water treating method can more advantageously reduce the economical and operational loads than the conventional method.

In addition, in the present method, the oil-containing waste water in which the sludge consisting of the fouling components is separated from the water, is introduced into the separating tank 14, where the sludge having a smaller specific gravity than that of the water floats on the surface of the waste water and is collected and removed using, e.g., a scraper. Thus, the removing of the sludge from the waste water and the discharging of the waste water from which the sludge has been removed can be easily carried out.

In addition, in the present method, the neutralizer is added to the waste water from which the sludge has been removed, so as to neutralize the waste water. Therefore, if the thus neutralized water is subjected, as needed, to the biochemical treatment, the neutralized water can be more effectively treated. Moreover, the neutral water discharged into the environment can be more effectively prevented from polluting the environment.

EXAMPLES

Hereinafter, there will be described some examples and some comparative examples to more concretely clarify the principle of the present invention. However, it is to be understood that the scope and spirit of the present invention are by no means limited to the details of those examples.

Example 1

First, towels that were used, in an automobile factory, to wipe off fouling components including oil, such as machine oil consisting of mineral oil; dust; etc., from machines, products, parts, etc., are prepared as laundry. In addition, a high-cationic flocculant consisting of acrylamide-quaternized dimethylaminoethyl methacrylate copolymer, whose degree of cationicity (i.e., mol % value of quaternized dimethylaminoethyl-methacrylate units relative to all polymerized units) is not less than 60 mol %, is prepared in an appropriate amount. This high-cationic flocculant is commercially available under the product name: CP-899 from Kurita Kogyo K.K., Japan.

Then, a non-ionic surfactant is added to 60° C. water (hot water), and additionally an appropriate amount of sodium metasilicate is added to the water so that a pH value of the water is 10.4. This water is used to clean the above-indicated laundry output from an automobile factory, and thereby obtain an oil-containing waste water in which the fouling components including oil and/or dust are finely dispersed in the water by the non-ionic surfactant. Respective measured values of pH and temperature of the thus obtained oil-containing waste water were 10.4 and 32° C.

Here, a biological oxygen demand (BOD) and a chemical oxygen demand (COD) of the thus obtained oil-containing waste water were measured in respective conventional methods; and a concentration of oil as the substance extracted by n-hexane from the fouling components of the waste water and a concentration of suspended substance, such as dust, other than the oil as the fouling component, were measured in respective known methods. The thus obtained results are shown in TABLE 1.

TABLE 1

|  | OIL-CONTAINING WASTE WATER | TREATED WATER |
|---|---|---|
| pH VALUE | 10.4 | 10.5 |
| BOD (mg/L) | 30,000 | 1,600 |
| COD (mg/L) | 4,400 | 1,000 |
| CONCENTRATION OF SUBSTANCE EXTRACTED BY n-HEXANE (mg/L) | 35,000 | 110 |
| CONCENTRATION OF SUSPENDED SUBSTANCE (mg/L) | 2,800 | 51 |

Next, an appropriate amount of the above-indicated high-cationic flocculant is added to an appropriate amount of the thus obtained oil-containing waste water whose pH value and temperature are 10.4 and 32° C., such that a concentration of the flocculant in the waste water is 400 mg/L, and then the waste water is agitated. Consequently the fouling components finely dispersed in the waste water are flocculated to form a sludge consisting of flocks of the fouling components. Thus, the oil-containing waste water is separated into the sludge consisting of flocks of the fouling components, and the water.

Then, the waste water in which the sludge and the water are separated from each other is introduced into a separating tank known in the art, so that the sludge floats on the surface of the waste water. Subsequently, the sludge is collected using a scraper and is removed from the water as a treated water. Here, a BOD value and a COD value of the thus obtained treated water from which the sludge has been removed were measured in the conventional methods; and a concentration of substance extracted by n-hexane from the treated water and a concentration of suspended substance in the treated water were measured in the known methods. The thus obtained results are also shown in TABLE 1.

As is apparent from the results shown in TABLE 1, the measured BOD and COD values of the treated water are significantly smaller than those of the oil-containing waste water. In addition, the concentration of the n-hexane-extracted substance in the treated water is very significantly lower than that of the n-hexane-extracted substance in the oil-containing waste water, i.e., the former is about three hundredths of the latter. Moreover, the concentration of the suspended substance in the treated water is largely decreased as compared with that of the suspended substance in the oil-containing waste water, i.e., the former is one fifty-sixth of the latter.

Example 2

First, mops that were used, in a metal working shop, to wipe off fouling components including oil, such as machine oil consisting of mineral oil; dust; mud; etc., from the floors of the shop, are prepared as laundry. In addition, the same high-cationic flocculant as used in EXAMPLE 1 is prepared in an appropriate amount.

Then, a non-ionic surfactant is added to 60° C. water (hot water), and additionally an appropriate amount of sodium metasilicate is added to the water so that a pH value of the water is equal to 11.9. This water is used to clean the above-indicated laundry output from the metal working shop, and thereby obtain an oil-containing waste water in which the fouling components including oil, dust and/or mud are finely dispersed in the water by the non-ionic surfactant. Respective measured values of pH and temperature of the thus obtained oil-containing waste water were 11.9 and 35° C.

Here, BOD and COD values of the thus obtained oil-containing waste water, a concentration of n-hexane-extracted substance in the waste water, and a concentration of suspended substance in the waste water were measured in the same methods as used in EXAMPLE 1. The thus obtained results are shown in TABLE 2.

TABLE 2

|  | OIL-CONTAINING WASTE WATER | TREATED WATER |
|---|---|---|
| pH VALUE | 11.9 | 11.9 |
| BOD (mg/L) | 4,600 | 97 |
| COD (mg/L) | 1,400 | 270 |
| CONCENTRATION OF SUBSTANCE EXTRACTED BY n-HEXANE (mg/L) | 7,800 | 96 |

TABLE 2-continued

|  | OIL-CONTAINING WASTE WATER | TREATED WATER |
|---|---|---|
| CONCENTRATION OF SUSPENDED SUBSTANCE (mg/L) | 1,100 | 39 |

Next, an appropriate amount of the above-indicated high-cationic flocculant is added to an appropriate amount of the thus obtained oil-containing waste water whose pH value and temperature are 11.9 and 35° C., such that a concentration of the flocculant in the waste water is 350 mg/L, and then the waste water is agitated. Consequently the fouling components finely dispersed in the waste water are flocculated to form a sludge consisting of flocks of the fouling components. Thus, the oil-containing waste water is separated into the sludge consisting of flocks of the fouling components, and the water.

Then, the sludge is removed from the waste water in which the sludge and the water are separated from each other, in the same manner as used in EXAMPLE 1, and thus a treated water is obtained. Here, BOD and COD values of the thus obtained treated water from which the sludge has been removed, a concentration of n-hexane-extracted substance in the treated water, and a concentration of suspended substance in the treated water were measured in the same methods as used in EXAMPLE 1. The thus obtained results are also shown in TABLE 2.

As is apparent from the results shown in TABLE 2, the measured BOD and COD values of the treated water are significantly smaller than those of the oil-containing waste water. In addition, the concentration of the n-hexane-extracted substance in the treated water is very significantly lower than that of the n-hexane-extracted substance in the oil-containing waste water, i.e., the former is not higher than one eightieth of the latter. Moreover, the concentration of the suspended substance in the treated water is largely decreased as compared with that of the suspended substance in the oil-containing waste water, i.e., the former is about one twenty-eighth of the latter.

Example 3

First, towels that were used, in a print factory, to wipe off fouling components including oil, such as machine oil consisting of mineral oil, and/or ink; dust; etc., from printing machines or other equipment, are prepared as laundry. In addition, the same high-cationic flocculant as used in EXAMPLE 1 is prepared in an appropriate amount.

Then, a non-ionic surfactant is added to 60° C. water (hot water), and additionally an appropriate amount of sodium metasilicate is added to the water so that a pH value of the water is equal to 10.6. This water is used to clean the above-indicated laundry output from the print factory, and thereby obtain an oil-containing waste water in which the fouling components including oil and/or dust are finely dispersed in the water by the non-ionic surfactant. Respective measured values of pH and temperature of the thus obtained oil-containing waste water were 10.6 and 30° C.

Here, BOD and COD values of the thus obtained oil-containing waste water, a concentration of n-hexane-extracted substance in the waste water, and a concentration of suspended substance in the waste water were measured in the same methods as used in EXAMPLE 1. The thus obtained results are shown in TABLE 3.

TABLE 3

|  | OIL-CONTAINING WASTE WATER | TREATED WATER |
|---|---|---|
| pH VALUE | 10.6 | 10.4 |
| BOD (mg/L) | 7,700 | 580 |
| COD (mg/L) | 5,000 | 990 |
| CONCENTRATION OF SUBSTANCE EXTRACTED BY n-HEXANE (mg/L) | 3,300 | 160 |
| CONCENTRATION OF SUSPENDED SUBSTANCE (mg/L) | 1,400 | 44 |

Next, an appropriate amount of the above-indicated high-cationic flocculant is added to an appropriate amount of the thus obtained oil-containing waste water whose pH value and temperature are 10.6 and 30° C., such that a concentration of the flocculant in the waste water is 300 mg/L, and then the waste water is agitated. Consequently the fouling components finely dispersed in the waste water are flocculated to form a sludge consisting of flocks of the fouling components. Thus, the oil-containing waste water is separated into the sludge consisting of flocks of the fouling components, and the water.

Then, the sludge is removed from the waste water in which the sludge and the water are separated from each other, in the same manner as used in EXAMPLE 1, and thus treated water is obtained. Here, BOD and COD values of the thus obtained treated water from which the sludge has been removed, a concentration of n-hexane-extracted substance in the treated water, and a concentration of suspended substance in the treated water were measured in the same methods as used in EXAMPLE 1. The thus obtained results are also shown in TABLE 3.

As is apparent from the results shown in TABLE 3, the measured BOD and COD values of the treated water are significantly smaller than those of the oil-containing waste water. In addition, the concentration of the n-hexane-extracted substance in the treated water is very significantly lower than that of the n-hexane-extracted substance in the oil-containing waste water, i.e., the former is not higher than one twentieth of the latter. Moreover, the concentration of the suspended substance in the treated water is largely decreased as compared with that of the suspended substance in the oil-containing waste water, i.e., the former is about one thirtieth of the latter.

Example 4

First, working gloves that were used by workers in an automobile factory and bear fouling components including oil, such as machine oil consisting of mineral oil; dust; mud; etc., are prepared as laundry. In addition, the same high-cationic flocculant as used in EXAMPLE 1 is prepared in an appropriate amount.

Then, a non-ionic surfactant is added to 60° C. water (hot water), and additionally an appropriate amount of sodium metasilicate is added to the water so that a pH value of the water is 11.8. This water is used to clean the above-indicated laundry output from the automobile factory, and thereby obtain an oil-containing waste water in which the fouling components including oil, dust and/or mud are finely dispersed in the water by the non-ionic surfactant. Respective measured values of pH and temperature of the thus obtained oil-containing waste water were 11.8 and 32° C.

Here, BOD and COD values of the thus obtained oil-containing waste water, a concentration of n-hexane-extracted substance in the waste water, and a concentration of suspended substance in the waste water were measured in the same methods as used in EXAMPLE 1. The thus obtained results are shown in TABLE 4.

TABLE 4

|  | OIL-CONTAINING WASTE WATER | TREATED WATER |
|---|---|---|
| pH VALUE | 11.8 | 11.9 |
| BOD (mg/L) | 290 | 270 |
| COD (mg/L) | 860 | 410 |
| CONCENTRATION OF SUBSTANCE EXTRACTED BY n-HEXANE (mg/L) | 1,300 | 120 |
| CONCENTRATION OF SUSPENDED SUBSTANCE (mg/L) | 340 | 43 |

Next, an appropriate amount of the above-indicated high-cationic flocculant is added to an appropriate amount of the thus obtained oil-containing waste water whose pH value and temperature are 11.8 and 32° C., such that a concentration of the flocculant in the waste water is 150 mg/L, and then the waste water is agitated. Consequently the fouling components finely dispersed in the waste water are flocculated to form a sludge consisting of flocks of the fouling components. Thus, the oil-containing waste water is separated into the sludge consisting of flocks of the fouling components, and the water.

Then, the sludge is removed from the waste water in which the sludge and the water are separated from each other, in the same manner as used in EXAMPLE 1, and thus treated water is obtained. Here, BOD and COD values of the thus obtained treated water from which the sludge has been removed, a concentration of n-hexane-extracted substance in the treated water, and a concentration of suspended substance in the treated water were measured in the same methods as used in EXAMPLE 1. The thus obtained results are also shown in TABLE 4.

As is apparent from the results shown in TABLE 4, the measured BOD and COD values of the treated water are smaller than those of the oil-containing waste water. In addition, the concentration of the n-hexane-extracted substance in the treated water is significantly lower than that of the n-hexane-extracted substance in the oil-containing waste water, i.e., the former is not higher than one tenth of the latter. Moreover, the concentration of the suspended substance in the treated water is decreased as compared with that of the suspended substance in the oil-containing waste water, i.e., the former is about one eighth of the latter.

Example 5

First, towels that were used, in a metal working shop, to wipe off fouling components including oil, such as machine oil consisting of mineral oil; dust; mud; etc., from various sorts of machines and equipments, are prepared as laundry. In addition, the same high-cationic flocculant as used in EXAMPLE 1 is prepared in an appropriate amount.

Then, a non-ionic surfactant is added to 60° C. water (hot water), and additionally an appropriate amount of sodium metasilicate is added to the water so that a pH value of the water is 10.1. This water is used to clean the above-indicated laundry output from the metal working shop, and thereby obtain an oil-containing waste water in which the fouling components including oil, dust and/or mud are finely dispersed in the water by the non-ionic surfactant. Respective measured values of pH and temperature of the thus obtained oil-containing waste water were 10.1 and 30° C.

Here, BOD and COD values of the thus obtained oil-containing waste water, a concentration of n-hexane-extracted substance in the waste water, and a concentration of suspended substance in the waste water were measured in the same methods as used in EXAMPLE 1. The thus obtained results are shown in TABLE 5.

TABLE 5

|  | OIL-CONTAINING WASTE WATER | TREATED WATER |
| --- | --- | --- |
| pH VALUE | 10.1 | 10.5 |
| BOD (mg/L) | 7,800 | 470 |
| COD (mg/L) | 3,000 | 510 |
| CONCENTRATION OF SUBSTANCE EXTRACTED BY n-HEXANE (mg/L) | 6,100 | 140 |
| CONCENTRATION OF SUSPENDED SUBSTANCE (mg/L) | 680 | 13 |

Next, an appropriate amount of the above-indicated high-cationic flocculant is added to an appropriate amount of the thus obtained oil-containing waste water whose pH value and temperature are 10.1 and 30° C., such that a concentration of the flocculant in the waste water is 300 mg/L, and then the waste water is agitated. Consequently, the fouling components finely dispersed in the waste water are flocculated to form a sludge consisting of flocks of the fouling components. Thus, the oil-containing waste water is separated into the sludge consisting of flocks of the fouling components, and the water.

Then, the sludge is removed from the waste water in which the sludge and the water are separated from each other, in the same manner as used in EXAMPLE 1, and thus a treated water is obtained. Here, BOD and COD values of the thus obtained treated water from which the sludge has been removed, a concentration of n-hexane-extracted substance in the treated water, and a concentration of suspended substance in the treated water were measured in the same methods as used in EXAMPLE 1. The thus obtained results are also shown in TABLE 5.

As is apparent from the results shown in TABLE 5, the measured BOD and COD values of the treated water are significantly smaller than those of the oil-containing waste water. In addition, the concentration of the n-hexane-extracted substance in the treated water is very significantly lower than that of the n-hexane-extracted substance in the oil-containing waste water, i.e., the former is not higher than one fortieth of the latter. Moreover, the concentration of the suspended substance in the treated water is largely decreased as compared with that of the suspended substance in the oil-containing waste water, i.e., the former is about one fifty-second of the latter.

Comparative Example 1

In this comparative example, a high-cationic flocculant is added to an oil-containing waste water such that a concentration of the flocculant in the waste water is higher than the upper limit, 1,000 mg/L, of the range defined according to the present invention, and a fouling-component flocculating effect of the flocculant is observed. To this end, first, towels that were used in a metal working shop and a certain amount of high-cationic flocculant are prepared as prepared in EXAMPLE 5.

The following steps are identical with the steps carried out in EXAMPLE 5, except that the high-cationic flocculant is added to an oil-containing waste water obtained by cleaning the towels, such that a concentration of the flocculant in the waste water is 1,050 mg/L that is higher than the upper limit of the range defined according to the present invention. Thus, the oil-containing waste water is separated into a sludge consisting of flocks of fouling components, and water as a treated water.

Here, BOD and COD values of each of the oil-containing waste water and the treated water, and respective concentrations of n-hexane-extracted substance and suspended substance in each of the oil-containing waste water and the treated water were measured in the same methods as used in EXAMPLE 5. The thus obtained results are shown in TABLE 6.

TABLE 6

|  | OIL-CONTAINING WASTE WATER | TREATED WATER |
| --- | --- | --- |
| pH VALUE | 10.1 | 10.7 |
| BOD (mg/L) | 7,800 | 1,200 |
| COD (mg/L) | 3,000 | 1,200 |
| CONCENTRATION OF SUBSTANCE EXTRACTED BY n-HEXANE (mg/L) | 6,100 | 500 |
| CONCENTRATION OF SUSPENDED SUBSTANCE (mg/L) | 680 | 50 |

As is apparent from the results shown in TABLE 6, the measured BOD and COD values of the treated water are only a little smaller than those of the oil-containing waste water. In addition, the concentration of the n-hexane-extracted substance in the treated water is lower than that of the n-hexane-extracted substance in the oil-containing waste water, i.e., the former is about one fifteenth of the latter; and the concentration of the suspended substance in the treated water is lower than that of the suspended substance in the oil-containing waste water, i.e., the former is about one twentieth of the latter. However, the respective amounts of lowering of the above-indicated parameters of the treated water are significantly smaller than those of the treated water observed in EXAMPLE 5.

Comparative Example 2

In this comparative example, a high-cationic flocculant is added to an oil-containing waste water such that a concentration of the flocculant in the waste water is lower than the lower limit, 100 mg/L, of the range defined according to the present invention, and a fouling-component flocculating effect of the flocculant is observed. To this end, first, towels that were used in a metal working shop and a certain amount of high-cationic flocculant are prepared as prepared in EXAMPLE 5.

Then, a non-ionic surfactant is added to a 60° C. water (hot water), and additionally an appropriate amount of sodium metasilicate is added to the water so that a pH value of the water is 10.1. This water is used to clean the above-indicated towels, and thereby obtain an oil-containing waste water in which the fouling components including oil, dust and/or mud are finely dispersed in the water by the non-ionic surfactant. Subsequently, an appropriate amount of dilute sulfuric acid is added to the thus obtained oil-containing waste water, to neutralize the waste water. Respective measured values of pH and temperature of the thus obtained oil-containing waste water were 6.5 and 35° C.

Here, BOD and COD values of the thus obtained oil-containing waste water, and respective concentrations of n-hexane-extracted substance and suspended substance in the waste water were measured in the same methods as used in EXAMPLE 5. The thus obtained results are shown in TABLE 7.

TABLE 7

|  | OIL-CONTAINING WASTE WATER | TREATED WATER |
| --- | --- | --- |
| pH VALUE | 10.1 | 6.5 |
| BOD (mg/L) | 7,800 | 700 |
| COD (mg/L) | 3,000 | 1,770 |
| CONCENTRATION OF SUBSTANCE EXTRACTED BY n-HEXANE (mg/L) | 6,100 | 1,830 |
| CONCENTRATION OF SUSPENDED SUBSTANCE (mg/L) | 680 | 520 |

Then, the same steps as the steps carried out in EXAMPLE 5 are carried out, and the oil-containing waste water is separated into a sludge consisting of flocks of fouling components, and water as treated water. Here, BOD and COD values of the treated water, and respective concentrations of n-hexane-extracted substance and suspended substance in the treated water were measured in the same methods as used in EXAMPLE 5. The thus obtained results are also shown in TABLE 7.

As is apparent from the results shown in TABLE 7, the measured BOD and COD values of the treated water are only a little smaller than those of the oil-containing waste water. In addition, the concentration of the n-hexane-extracted substance in the treated water is lower than that of the n-hexane-extracted substance in the oil-containing waste water, i.e., the former is about one third of the latter; and the concentration of the suspended substance in the treated water is lower than that of the suspended substance in the oil-containing waste water, i.e., the former is about three fourths of the latter. However, the respective amounts of lowering of the above-indicated parameters of the treated water are significantly smaller than those of the treated water observed in EXAMPLE 5.

Comparative Example 3

In this comparative example, a pH value of an oil-containing waste water is made greater than the upper limit, 12, of the range defined according to the present invention, and a fouling-component flocculating effect of a high-cationic flocculant is observed. To this end, first, towels that were used in a metal working shop and a certain amount of high-cationic flocculant are prepared as prepared in EXAMPLE 5.

The following steps are identical with the steps carried out in EXAMPLE 5, except that an appropriate amount of sodium hydroxide is added to oil-containing waste water obtained by cleaning the towels, such that a pH value of the waste water is equal to 13.7 that is higher than the upper limit of the range defined according to the present invention. Thus, the oil-containing waste water is separated into a sludge consisting of flocks of fouling components, and water as a treated water.

Here, BOD and COD values of each of the oil-containing waste water and the treated water, and respective concentrations of n-hexane-extracted substance and suspended substance in each of the oil-containing waste water and the treated water were measured in the same methods as used in EXAMPLE 5. The thus obtained results are shown in TABLE 8.

TABLE 8

|  | OIL-CONTAINING WASTE WATER | TREATED WATER |
| --- | --- | --- |
| pH VALUE | 10.1 | 13.7 |
| BOD (mg/L) | 7,800 | 980 |
| COD (mg/L) | 3,000 | 1,620 |
| CONCENTRATION OF SUBSTANCE EXTRACTED BY n-HEXANE (mg/L) | 6,100 | 730 |
| CONCENTRATION OF SUSPENDED SUBSTANCE (mg/L) | 680 | 130 |

As is apparent from the results shown in TABLE 8, the measured BOD and COD values of the treated water are only a little smaller than those of the oil-containing waste water. In addition, the concentration of the n-hexane-extracted substance in the treated water is lower than that of the n-hexane-extracted substance in the oil-containing waste water, i.e., the former is about one eighth of the latter; and the concentration of the suspended substance in the treated water is lower than that of the suspended substance in the oil-containing waste water, i.e., the former is about one fifth of the latter. However, the respective amounts of lowering of the above-indicated parameters of the treated water are significantly smaller than those of the treated water observed in EXAMPLE 5.

Comparative Example 4

In this comparative example, a temperature of an oil-containing waste water is made higher than the upper limit, 50° C., of the range defined according to the present invention, and a fouling-component flocculating effect of a high-cationic flocculant in the waste water is observed. To this end, first, towels that were used in a metal working shop and a certain amount of high-cationic flocculant are prepared as prepared in EXAMPLE 5.

Then, a non-ionic surfactant is added to 60° C. water (hot water), and additionally an appropriate amount of sodium metasilicate is added to the water so that a pH value of the water is 10.1. This water is used to clean the above-indicated towels, and thereby obtain an oil-containing waste water in which the fouling components including oil, dust and/or mud are finely dispersed in the water by the non-ionic surfactant. Subsequently, the thus obtained oil-containing waste water is heated so that a temperature of the waste water is equal to 70° C. A measured value of pH of the thus heated oil-containing waste water was 10.1.

Here, BOD and COD values of the thus obtained oil-containing waste water, and respective concentrations of n-hexane-extracted substance and suspended substance in the waste water were measured in the same methods as used in EXAMPLE 5. The thus obtained results are shown in TABLE 9.

TABLE 9

|  | OIL-CONTAINING WASTE WATER | TREATED WATER |
|---|---|---|
| pH VALUE | 10.1 | 10.5 |
| BOD (mg/L) | 7,800 | 930 |
| COD (mg/L) | 3,000 | 780 |
| CONCENTRATION OF SUBSTANCE EXTRACTED BY n-HEXANE (mg/L) | 6,100 | 430 |
| CONCENTRATION OF SUSPENDED SUBSTANCE (mg/L) | 680 | 140 |

Then, the same steps as the steps carried out in EXAMPLE 5 are carried out, and the oil-containing waste water is separated into a sludge consisting of flocks of fouling components, and water as a treated water. Here, BOD and COD values of the treated water, and respective concentrations of n-hexane-extracted substance and suspended substance in the treated water were measured in the same methods as used in EXAMPLE 5. The thus obtained results are also shown in TABLE 9.

As is apparent from the results shown in TABLE 9, the measured BOD and COD values of the treated water are only a little smaller than those of the oil-containing waste water. In addition, the concentration of the n-hexane-extracted substance in the treated water is lower than that of the n-hexane-extracted substance in the oil-containing waste water, i.e., the former is about one fourteenth of the latter; and the concentration of the suspended substance in the treated water is lower than that of the suspended substance in the oil-containing waste water, i.e., the former is about one fifth of the latter. However, the respective amounts of lowering of the above-indicated parameters of the treated water are significantly smaller than those of the treated water observed in EXAMPLE 5.

It is to be understood that the present invention may be embodied with other changes, modifications, and improvements that may occur to a person skilled in the art, without departing from the spirit and scope of the invention defined in the appended claims.

What is claimed is:

1. A method of treating an oil-containing waste water which is produced by washing, with a surfactant, an article bearing at least one fouling component including an oil, and in which said at least one fouling component is finely dispersed in the water by the surfactant, the method comprising the step of:

adding, under a condition that the oil-containing waste water has been adjusted to have a pH value greater than eight and smaller than twelve and have a temperature not higher than 50° C., a high-cationic flocculant consisting of a high-molecular material which is selected from the group consisting of acrylamide-quaternized or salified dimethylaminoethyl acrylate or methacrylate copolymer, and acrylamide-quaternized or salified dimethylaminoethyl acrylate or methacrylate-acrylic acid copolymer, and which is constituted by a plurality of polymerized units not less than 60 mol % of which have respective cationic functional groups, to the oil-containing waste water, said flocculant being added to the oil-containing waste water in an amount according to the following formula:

$$P = k \cdot \sqrt{(N)}$$

where P is an amount (mg/L) of the flocculant to be added; k is a coefficient ranging from 2 to 5; and N is an amount of substance extracted from the waste water by n-hexane, such that a concentration of the high-cationic flocculant in the oil-containing waste water falls in a range of from 100 mg/L to 1,000 mg/L, so that said at least one fouling component dispersed in the water is flocculated to form a sludge consisting of flocks of said at least one fouling component and thereby separate said at least one fouling component and the water from each other.

2. The method according to claim 1, further comprising a step of introducing the waste water in which the sludge has been formed, into a separating tank, so that the sludge floats on a surface of the waste water.

3. The method according to claim 1, further comprising a step of adding, after the sludge is removed from the waste water in which the sludge has been formed and accordingly said at least one fouling component and the water have been separated from each other, a neutralizer to the waste water to neutralize the waste water.

4. The method according to claim 1, further comprising a step of filtering the oil-containing waste water to remove solid matters, prior to the addition of the high-cationic flocculant.

5. The method according to claim 1, wherein the pH value of the oil-containing waste water is adjusted by adding sodium metasilicate to the waste water.

* * * * *